United States Patent
Campbell et al.

(10) Patent No.: US 6,854,426 B2
(45) Date of Patent: Feb. 15, 2005

(54) PORTABLE CORRAL APPARATUS

(75) Inventors: Darrell D. Campbell, Buffalo Gap, SD (US); Dana Sander, Buffalo Gap, SD (US)

(73) Assignee: Prairie Ridge Partners, Buffalo Gap, SD (US)

( * ) Notice: Subject to any disclaimer, the term of this patent is extended or adjusted under 35 U.S.C. 154(b) by 219 days.

(21) Appl. No.: 10/431,760

(22) Filed: May 8, 2003

(65) Prior Publication Data

US 2003/0209208 A1 Nov. 13, 2003

Related U.S. Application Data

(63) Continuation-in-part of application No. 10/351,656, filed on Jan. 24, 2003, which is a continuation-in-part of application No. 10/141,227, filed on May 7, 2002.

(51) Int. Cl.[7] .................................................. A01K 1/02
(52) U.S. Cl. ........................ 119/513; 119/512; 119/519
(58) Field of Search ................................. 119/513, 512, 119/502, 504, 514, 519, 522, 840, 843

(56) References Cited

U.S. PATENT DOCUMENTS

| | | | |
|---|---|---|---|
| 2,491,577 A | * 12/1949 | Olinger ........................ 256/25 |
| 2,678,629 A | 5/1954 | Meyer | |
| 2,935,965 A | 5/1960 | Smith | |
| 3,726,256 A | * 4/1973 | Bernhardt et al. .......... 119/512 |
| 3,741,529 A | 6/1973 | Blagg | |
| 3,767,167 A | 10/1973 | Rasmussen | |
| 3,921,585 A | * 11/1975 | Hall ............................ 119/512 |
| 3,970,045 A | 7/1976 | Graham, Jr. | |
| 4,048,959 A | 9/1977 | Steele | |
| 4,090,472 A | 5/1978 | York | |
| 4,250,836 A | * 2/1981 | Smith .......................... 119/512 |
| 4,366,775 A | 1/1983 | Tyquin | |
| 4,537,151 A | * 8/1985 | Bolton ........................ 119/512 |
| 4,619,223 A | 10/1986 | Koehn | |
| 4,630,570 A | 12/1986 | Wilson et al. | |
| 4,821,679 A | 4/1989 | Hackert | |
| 4,924,813 A | * 5/1990 | Bixler et al. ................. 119/848 |
| RE33,959 E | 6/1992 | Mollhagen | |
| 5,381,757 A | 1/1995 | Putney | |
| 5,651,333 A | 7/1997 | Fisher | |
| 6,067,940 A | * 5/2000 | Holder ........................ 119/512 |
| 6,405,124 B1 | * 6/2002 | Hutton ........................ 701/200 |
| 6,450,124 B1 | 9/2002 | Calvert et al. | |
| 6,467,433 B1 | * 10/2002 | Stanton et al. .............. 119/512 |
| 6,477,985 B1 | * 11/2002 | Mennenga et al. ......... 119/512 |
| 6,499,435 B2 | * 12/2002 | Markham ................... 119/512 |

* cited by examiner

Primary Examiner—Yvonne R. Abbott
(74) Attorney, Agent, or Firm—Gordon & Rees LLP

(57) ABSTRACT

A corral apparatus has mounting brackets for securing at spaced locations on a wall of a vehicle, livestock trailer, or building, a pair of side panels each having a first end pivotally connected to a respective bracket, and an end panel pivotally secured between the second ends of the side panels, whereby the apparatus can be pivoted between an operative condition in which each side panel extends transverse to the surface and the end panel extends between the ends of the side panels, and a storage position in which the panels are folded flat against one another and the surface.

29 Claims, 6 Drawing Sheets

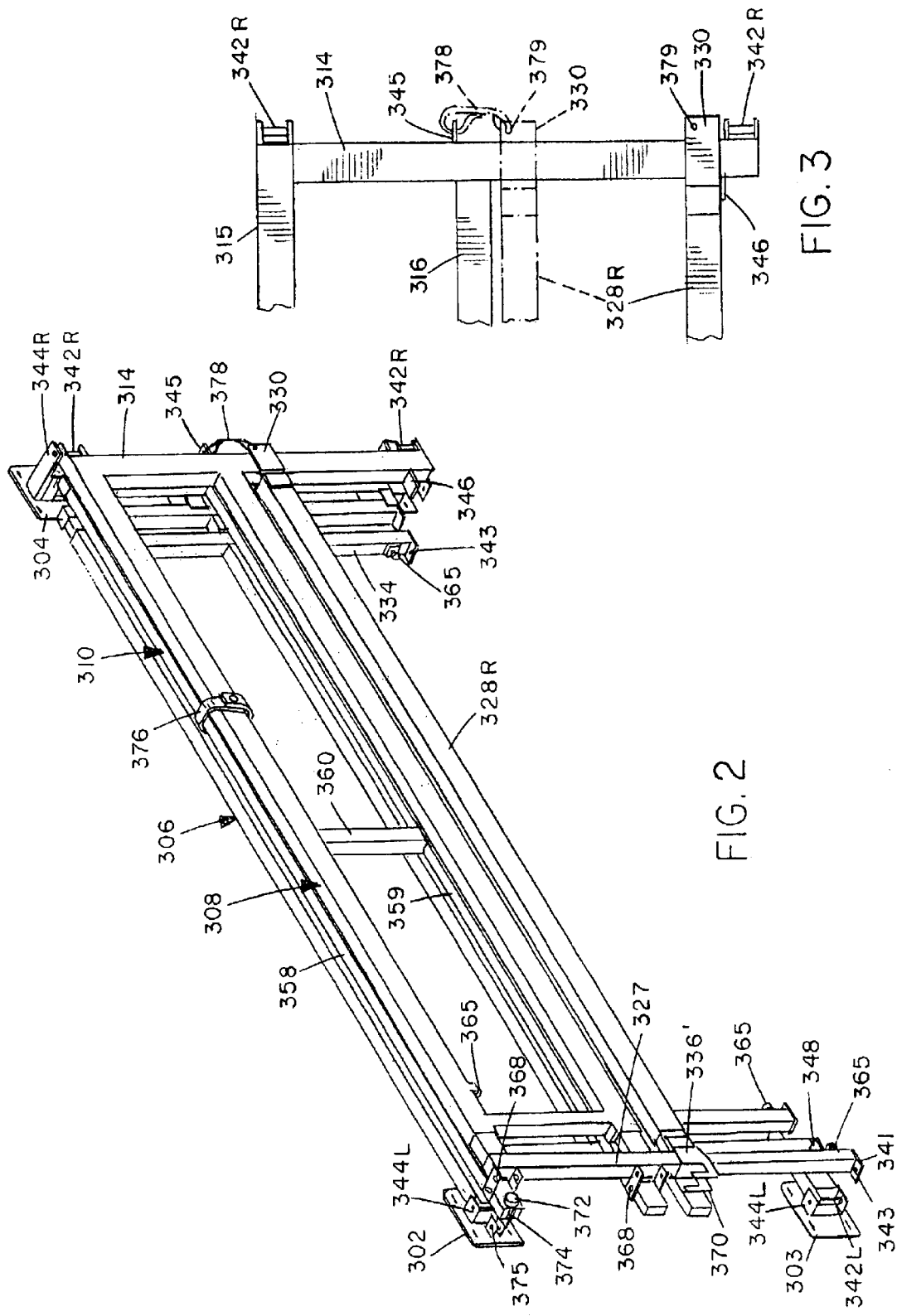

PORTABLE CORRAL APPARATUS

CROSS REFERENCE TO RELATED APPLICATIONS

This application is a Continuation-In-Part of pending application Ser. No. 10/351,656 filed Jan. 24, 2003, which was a Continuation-in-Part of pending application Ser. No. 10/141,227, filed May 7, 2002.

BACKGROUND OF THE INVENTION

The present invention relates generally to portable corrals for horses or other animals, and is particularly concerned with a corral for attachment to a horse trailer or other animal transportation vehicle, or to a wall of a building such as a barn.

Horses used for competition and recreation are frequently transported via horse trailer to a variety of locations for such activities. Unfortunately, many of these locations either do not have facilities for horses to be stalled, the facilities are full, or the facilities are unsafe. Those traveling with horses, therefore, often bring along corral equipment that can be set up at the location for confining the horse. This equipment is either removably attached to the horse trailer or carried in the tow vehicle.

Materials often used in making these portable corrals include metal piping formed into fence panels, rope or electric wire, or woven plastic or rope. These materials are often connected to portable stakes driven into the ground to form fence posts.

Portable metal corrals have been used by those handling livestock for many years because of metal's durability and high-visibility to the animal. Specifically, many forms of portable corrals have been invented. Many of these corrals, however, are cumbersome due to multiple parts that must be lifted and removed from the trailer and require time-consuming assembly. For example, U.S. Pat. No. 4,537,151 to Bolton discloses that the corral assembly be hoisted with a winch along a vertical support pipe up onto mounting brackets. The corral assembly by Blagg, U.S. Pat. No. 3,741,529 is so weighty and cumbersome that it requires two men to load and unload the assembly from the horse trailer. Bernhardt, U.S. Pat. No. 3,726,256, requires that part of the assembly be placed on the roof of the trailer and parts of it be lifted onto a holding means on the side of the trailer.

There are times when the horse person may wish to adjust the size of the corral due to parking constraints or terrain concerns. In this situation, none of the above corrals could be made smaller or of un-uniform size.

Safety is the key concern of a person traveling with a horse. Some portable corrals on the market are of such a height or material that they allow a horse to reach over the top rail or under the bottom rail with its head in an attempt to graze, leading to an unsafe situation if the horse were to become startled. Additionally, the corral assembly may become damaged.

Fences are also used on people's property to contain and protect pets and children. Such fences are usually permanently installed with posts driven into the ground. A permanent fence may not be ideal in terms of cost, aesthetic concerns or for people who are not permanent residents of the property. Nonpermanent fences in the past have been unstable and cumbersome to assemble.

People traveling in motor homes or with travel trailers often travel with their pets and children. Having a "yard" for the pets or children to play safely in would be advantageous. As space in such motor homes or travel trailers is often limited, such yard fencing would best be stored on the exterior of the vehicle in a compacted form.

SUMMARY OF THE INVENTION

It is an object of the present invention to provide a new and improved corral for temporary stabling and handling of livestock which can be mounted in a folded position on a horse trailer and then unfolded and expanded with ease. A further object of the invention is to provide a new and improved enclosure for attachment to other vehicles, such as recreational vehicles and other trailers. Additionally, the claimed invention may be attached to a home to provide a nonpermanent fence to enclose pets or to prevent children from entering a dangerous area such as a pool, or may be attached to a barn wall to provide a collapsible animal enclosure.

According to the present invention, a corral apparatus is provided, which comprises mounting brackets for securing at predetermined spaced locations on a surface of a vehicle, trailer, or building, a first side panel having a first end pivotally secured at least one of the mounting brackets and a second end, a second side panel having a first end pivotally secured to the other mounting bracket and a second end, and an end panel extending between the second ends of the side panels, whereby an enclosure is formed by the surface, side panels, and end panel, the end panel being pivotally secured to at least one of the side panel second ends, and being movable between a deployed position extending transversely between the side panels and a collapsed position folded inwardly against at least one of the side panels, and the side panels being movable between a deployed position extending outwardly from the surface and a collapsed position folded flat against one another and the surface.

The end panel may be pivoted at one end to one of the side panels and releasably secured to the other side panel end. In an exemplary embodiment, the end panel is formed in one part, but may be formed in two parts, one part pivoted to one of the side panels and the other part pivoted to the other side panel, with the two parts releasably connected together to provide a gate for entry and exit from the enclosure, as well as to allow the end panel to be collapsed against the side panels for storage.

The two side panels may each be formed from two telescoping or relatively slidable parts to allow for adjustment of the size of the corral. For example, one part or panel portion may have upper and lower channels on its inner or outer face slidably engaged with upper and lower bars on the other part or panel portion, which is offset outwardly or inwardly from the other panel portion so as to slide over it into a retracted position to reduce the corral size. In an exemplary embodiment of the invention, each side panel is formed from at least two parallel rails extending between vertical end posts, and each rail is formed from two telescopically engaged members to allow the length of the panel to be adjusted.

In another embodiment of the invention, an add-on corral section is provided to allow deployment of two side-by-side corrals or one larger corral. The add-on section comprises an additional mounting bracket for securing to a vehicle, trailer or building at a spaced location from the first side panel, a third side panel having a first end pivotally secured to the third mounting bracket and a second end, and a second end panel having a first end pivotally secured to the second end of the third side panel and second end for releasable latching engagement with the first end panel. With this arrangement, the first side panel, third side panel, and second end panel together form an additional corral or enclosure for a second animal.

When the apparatus of this invention is secured to a vehicle such as a livestock or horse trailer, it may be readily stored flat against a wall of the trailer during transportation. Upon arrival at a destination, it can be deployed quickly and easily by one person, simply by folding out the side and end walls and adjusting to the desired size. The side and end panels in an exemplary embodiment are all formed by vertical tubular posts and horizontal tubular rails extending between the posts, and are of relatively lightweight construction, so that they can be deployed and collapsed easily by one person.

BRIEF DESCRIPTION OF THE DRAWINGS

The present invention will be better understood from the following detailed description of some exemplary embodiments of the invention, taken in conjunction with the accompanying drawings in which like reference numerals refer to like parts and in which:

FIG. 2 is a perspective view of the apparatus of FIG. 1 in a collapsed, folded storage condition;

FIG. 3 is an enlarged view of the end of one side panel, illustrating the raised and lowered positions of the lower rail;

DETAILED DESCRIPTION OF THE DRAWINGS

Figure 1:
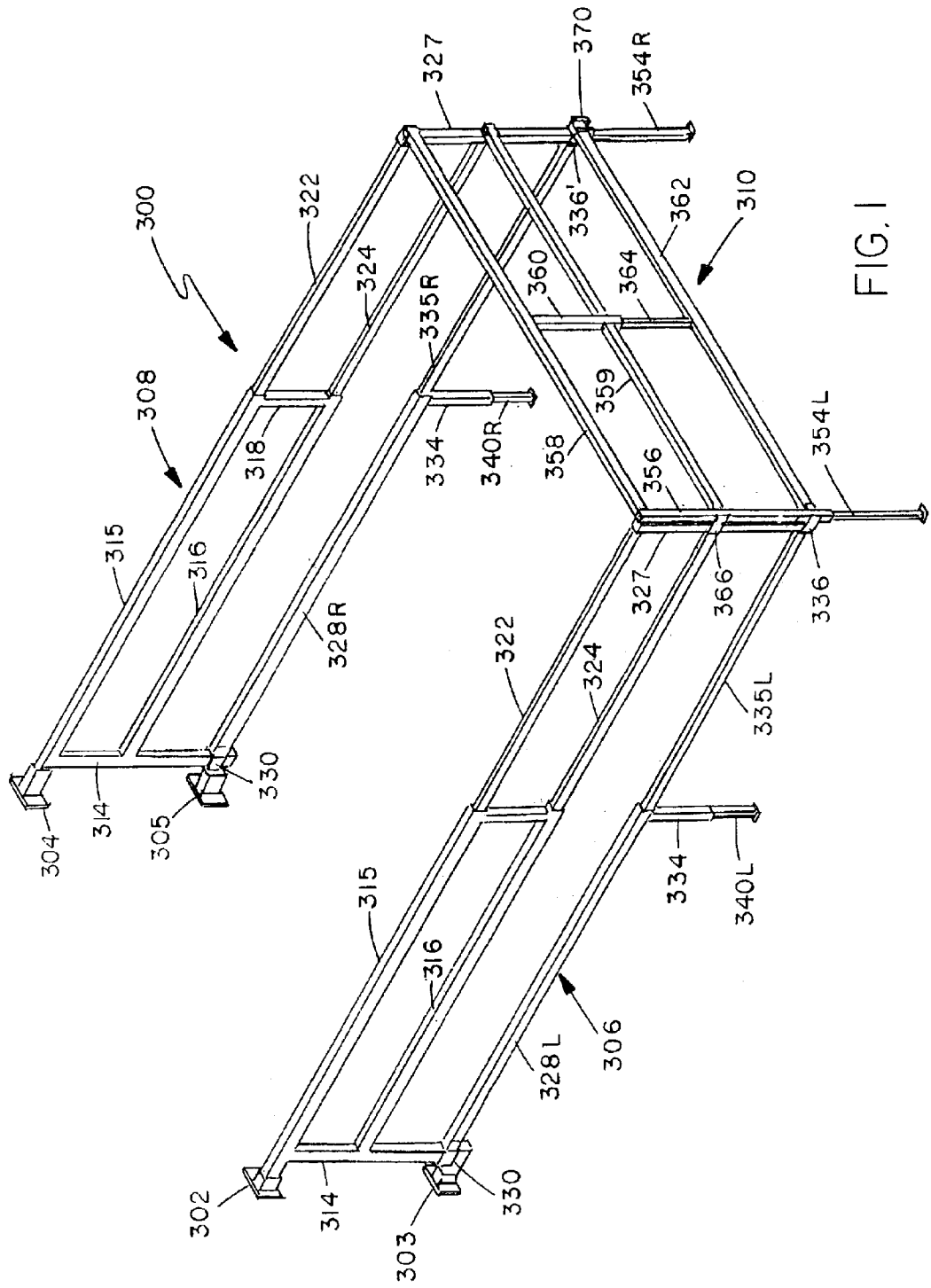
FIG. 1 is a perspective view of a corral apparatus according to a first embodiment of the invention.

FIGS. 1 to 4 illustrate a portable and collapsible corral apparatus 300 according to a first embodiment of the invention. The apparatus 300 has a left pair 302,303 and a right pair 304,305 of mounting brackets for securing to the side or end wall of an animal trailer, or to any other convenient surface such as a barn or other building wall. A left side panel 306, a right side panel 308, and an end panel 310 form the corral enclosure. The left and right side panels are hinged to the respective left and right mounting brackets, while the end panel 310 has one end hinged or pivoted to the end of the right side panel 308.

Figure 4:
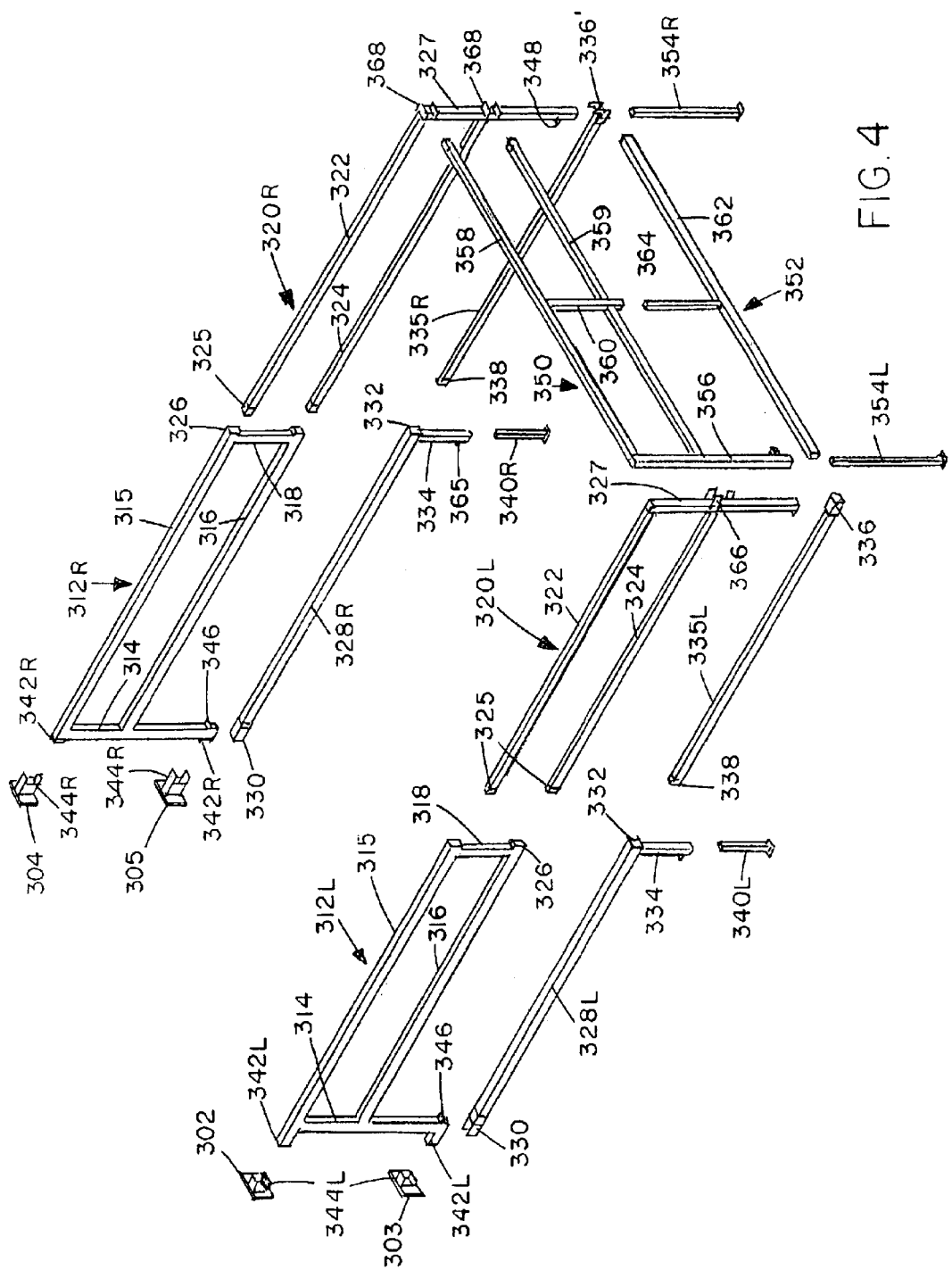
FIG. 4 is an exploded, perspective view of the corral apparatus of FIGS. 1 to 3, illustrating the parts of the apparatus separated.

As best illustrated in the exploded view of FIG. 4, each side panel is made up from five basic parts, each formed from lightweight tubing such as aluminum, steel, plastic, fiberglass or the like which has sufficient strength to retain an animal in the enclosure but which is sufficiently lightweight to allow one person to deploy or fold up the apparatus without undue effort. A first upper rail member 312L, 312R has a vertical post 314 at one end and two parallel rails 315,316 extending from the post 314, connected by a vertical bar 318 at their opposite ends. A second upper rail member 320L,320R has two parallel rails 322,324 with ends 325 designed for telescoping engagement in the open ends 326 of the rails 315,316, and a vertical post 327 at the opposite end. A first lower rail 328L,328R has a first end with projecting brackets 330 for sliding engagement over the vertical post 314 of the first upper rail member, and a second, open end 332, with a vertical leg 334 projecting downwardly from the second end 332. A second lower rail 335L, 335R has a pair of brackets 336, 336' projecting from one end for sliding engagement over vertical post 327, and a second end 338 designed for telescoping engagement in the open end 332 of the first lower rail. The final part of each side panel is a lower leg or support post 340L,340R which is in telescoping engagement with the vertical leg 334 of the lower rail 328L, 328R when the parts are assembled as in FIG. 1.

The vertical post 314 of each upper rail member 312L, 312R has a pair of hinge members 342L, 342R for pivoting engagement with the hinge brackets 344L, 344R on the respective mounting brackets, as best illustrated in FIG. 2. Hinge brackets 344R on the right hand side will be longer than those on the left hand side to accommodate the folded positions of the left and right hand side panels, as also illustrated in FIG. 2. Also provided on each vertical post is a locking tab 345 adjacent the middle rail 316 and facing towards the mounting brackets, and a projecting tab or stop plate 346 projecting in the opposite direction adjacent the lower end of each post 314. A similar projecting tab or stop plate 348 is provided adjacent the lower end of the opposite end posts 327.

The end panel 310 is formed from four basic parts, comprising an upper rail member 350, a lower rail member 352, and two lower support legs or posts 354L,354R. The upper rail member 350 has a vertical end post 356 and two horizontal rails 358,359 extending from the end post, with a vertical bar 360 extending between the horizontal rails at approximately their mid point. The left hand support leg 354L is telescopically engaged in the open lower end of end post 356 of the end panel 310, but the right hand support leg 354R engages in the open lower end of the end post 327 of the right side panel 308. The lower rail member 352 comprises a single lower rail 362 with a vertical bar 364 extending upwardly from its mid point and telescopically engaging in an open lower end of the vertical bar 360. Thus, there are eleven adjustable, telescopically engaged pairs of tubes in the corral apparatus, at the junctions between each first and second upper rail member, between each lower rail member, between each of the four lower legs or support posts 340L, 340R, 354L, 354R and the respective end posts, and between the lower rail member 352 and the upper rail member 350 of the end panel. Each of these junctions is identical, and one such junction will be described between the vertical leg 334 and the lower leg 340L of the left side panel 306. Each lower leg 340L, 340R, 354L, and 354R will be provided with a series of spaced openings (not visible in the drawings), while the vertical leg 334 (or end post 327 or 356) has a pop or snap lock pin 365 (such as a Vlier locking pin) mounted adjacent its lower, open end. This is designed to engage through a selected opening in the telescoping lower leg in order to hold this leg in a retracted position or at any selected extension, as will be discussed in more detail below. Similarly, each of the upper telescoping rails 315 and lower telescoping rails 328R of the right side panel 308 will have snap lock pins 365 for engaging through openings in the mating telescoping rails 322, 335R. Some of these snap lock pins can be best seen in FIG. 17. The telescoping rails of the left hand panels have no associated snap lock pins, since this panel acts as a gate and is secured to the end panel, in any selected extended position, as described below. These rails have a snap lock system for safety purposes to prevent the rails from over-extending. Each of the four lower legs also has a flat end pad or foot pad 341 with a hole 343 through which a suitable anchor pin or post may be engaged if desired, for additional stability.

The outer end posts 327 of the side panels are slightly different from one another. The left side panel acts as a gate and is therefore releasably secured to the end post 356 of the end panel, while the opposite end of the end panel is pivoted to the end post 327 of the right hand side panel. Thus, end post 327 of the left side panel has projecting flanges or end brackets 366 for engaging on opposite sides of the end post 356 of the end panel 310, and any suitable locking mechanism may be provided for extending through openings in the end brackets 366 to lock the gate, such as a carabineer, padlock, or the like. The end post 327 of the right side panel 308 has two pairs of spaced pivot brackets 368 which are pivoted to the free ends of the respective horizontal rails 358,359 of the end panel upper rail member 350, as best illustrated in FIG. 2. At the same time, the slide brackets on the end of the lower rail 335R of the right side panel, which engage on opposite sides of the end post 327, are extended beyond the end post 327 and provided with hook like indents 370 in which the right hand end of the lower rail 362 of the end panel will be seated when in its lowermost, deployed position as in FIG. 1. A stop tab (not visible in the drawings) will also be provided adjacent the lower end of the left hand end post 327 for seating the opposite end of the lower rail 362 when positioned as in FIG. 1.

FIG. 2 illustrates the corral apparatus in a folded, storage position against a wall on which the mounting brackets 302–305 are mounted, such as the wall of a trailer. Various locking devices may be provided to hold the apparatus in this position. In the illustrated embodiment, the folded apparatus is held in position by locking means which secure the upper left hand corner of the folded apparatus to the upper left hand mounting bracket 302. A lock knob or J bolt 372 extends through a slot 374 at the end of the top rail 358 of the end panel and into a suitable threaded hole or fixture (not illustrated) on the mounting bracket 302. At the same time, in case the lock knob should fail, the right side panel 308, which is at the front when the apparatus is folded, is also secured to the trailer wall by a strap (not illustrated) which is secured to mounting flanges 375 on the wall mounting bracket 302 at one end, and through a hole in one of the pivot brackets on end or corner post 327. The front panel 308 is also tied to the end panel 310 in the folded position by a strap 376 which is wrapped around the upper rails 358 and 315 of these panels and snapped in place.

Each of the lower rails of the side panels are secured in the raised position of FIG. 2, adjacent the middle rail, by suitable safety straps 378, as best illustrated in FIGS. 2 and 3. Strap 378 is secured to an opening 379 in the slide bracket 330 at the end of lower rail 328L or 328R, and is threaded through an opening in tab 345 on the post 314 before being snapped into the illustrated, locked position. Alternatively, the tab 345 may be replaced by a snap connector on post 314 to which the end of strap 378 is secured. A similar safety strap arrangement (not illustrated) will be provided at the opposite end of the telescoping part 335L or 335R of the lower rail. In the stored position, each of the telescoping lower legs or support posts 340L,340R,354L and 354R is telescoped inwardly into the corresponding post as far as possible, into the retracted position illustrated in FIG. 2, and locked in that position by the associated snap lock pin 365. Similarly, each of the telescoping end portions of the side panel rails 322,324,335R is in the fully retracted position, retracted as far as possible into the associated rail 315,316, 328R and locked in the retracted position by the associated Vlier lock pin 365.

The procedure for extending the corral apparatus from the position illustrated in FIG. 2 to the deployed position of FIG. 1 will now be described in more detail. The trailer to which the apparatus is secured must first be parked on level ground in an area where the animal or animals can be kept. The corral lock knob 372 is then unscrewed and folded out of the way of slot 374. The safety strap at the left hand upper corner is also unhooked and allowed to hang at the trailer wall. At this point, the right side panel 308, which is at the front when the apparatus is folded away for storage, can be swung out about hinges 344R until it is positioned 90 degrees to the trailer wall. Safety strap 378 is then released and unhooked at each end of the lower rail of panel 308, allowing the lower rail 328R,335R to be lowered until it is seated on the stop tabs 346,348. The snap locking pin 365 holding the lower leg 340R is then pulled and twisted to release the lower leg and allow it to drop to the ground. Once the lower leg is in the proper position, the locking pin 365 is released to lock the leg in place. The telescoping portions of the rails of the right side panel are now extended until the side panel is at the desired length (dependent on the corral size requirements and space availability). The locking pin 365 on the upper rail 315 is twisted and pulled out, and the end or corner post 327 is pulled out to the desired corral size. The pin 365 is then released to extend into an aligned opening in telescoping rail 320R, locking the parts in the adjusted position. The Vlier locking pin 365 on the end or corner post 327 is then pulled out to allow the lower leg 354R at the corner of the corral to drop to the ground. The locking pin is then released to lock the lower leg 354 in the lowered position. The assembly of the right side panel 308 is now complete.

While the right side panel is being deployed, it is important that the end panel 310, which is pivoted to this side panel, is held against the side panel by safety strap 376 so that it does not swing out prematurely. When the right side panel has been extended, the safety strap 376 is released, and the front end panel 310 is swung 90 degrees to the right side panel 308, parallel with the trailer wall. The locking pin 365 on the left hand post 356 is then pulled out to allow the lower leg 354L to drop to the ground, and then released to allow the pin to return to the locking position to secure leg 354L. The locking pin 365 on the middle post or bar 360 is then pulled out, allowing the lower rail 362 to be lowered down until one end is seated on the hooked end 370 of bracket 336 and the other end is seated on the stop tab on post 356. The locking pin 365 is then released to lock the lower rail 362 in place. The front end panel 310 of the corral is now fully deployed.

The left side panel 306 is now swung out about the hinges 342L,344L into a position 90 degrees to the trailer wall. The lower rail 328L, 335L is lowered after unhooking the safety straps 378, in exactly the same manner as the lower rail of the right side panel, and seated on the stop tabs 346,348. The end rails 320L and 335L are then extended until the end post 327 is located adjacent to the end post 356 of the end panel, in the position illustrated in FIG. 1. At this point, the gate flanges 366 will extend over the end post 356, and are locked in position by a padlock, carabineer, or the like.

It will be understood that the left side panel acts as a gate to the corral. If the extendable part 320L,335L of the panel is fully extended, the gate may be opened and closed simply by releasing the gate lock or latch and pushing the parts 320L,335L inwardly so that they telescope into the associated rails 315, 316, and 328L, and then pulling them out again and re-latching the gate after the animal or animals have entered the corral. If a smaller corral is being used, due to lack of space, for example, the hinged portion 312L of the side panel can act as the gate, and may simply be pivoted outwardly and inwardly after releasing the gate latch or lock.

The apparatus of FIGS. 1 to 4 is of simple, lightweight construction and is quick and easy to assemble for use, and to fold away for storage after use. Assembly does not require excessive strength or dexterity, since the panels are fully supported on the trailer wall and do not have to be lifted, just folded out and in. Returning the corral from the deployed condition of FIG. 1 back to the stored position of FIG. 2 will simply involve reversing the steps described above.

Figure 5:
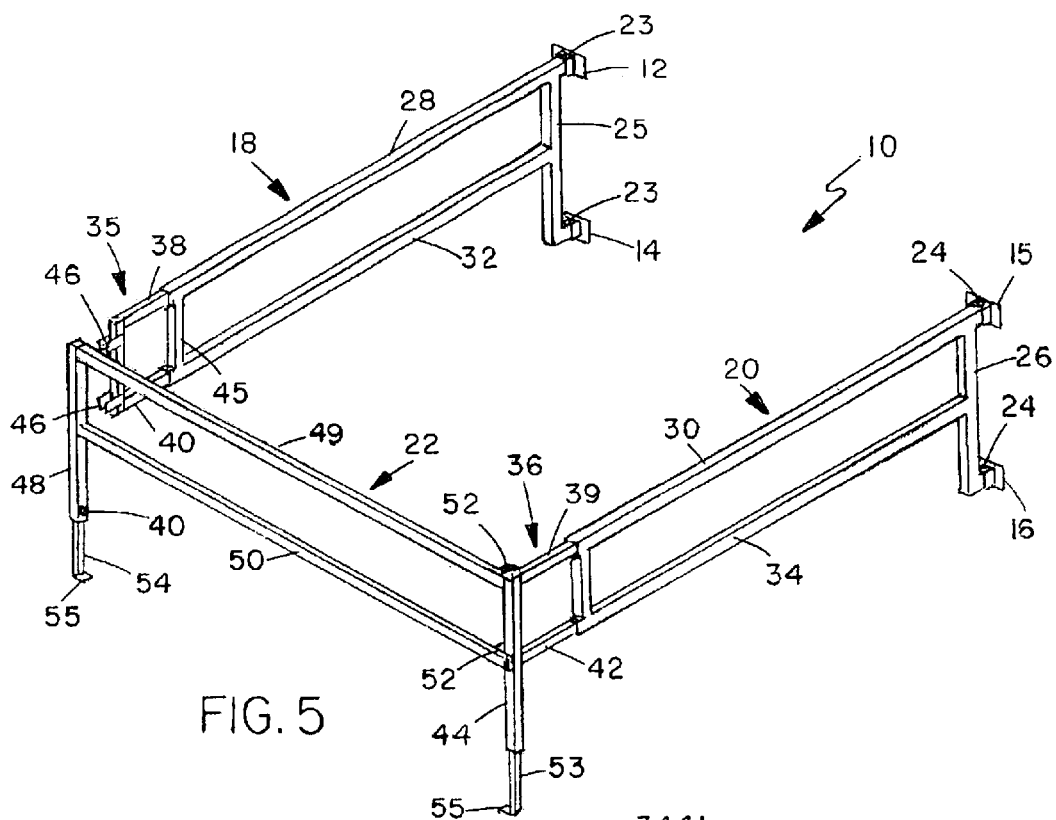
FIG. 5 is a perspective view of an alternative, two rail corral apparatus according to a second embodiment of the invention.

FIG. 5 illustrates a corral apparatus 10 according to another embodiment of the invention which is similar to the previous embodiment but eliminates the third, sliding rail of each panel. The apparatus 10, as in the previous embodiment, has a left pair 12,14 and a right pair 15,16 of mounting brackets for securing to the side or end wall of an animal trailer, or to any other convenient surface such as the side of a barn. A left side panel 18, right side panel 20, and end panel 22 complete the enclosure. The left and right side panels 18,20 are pivotally connected or hinged to the respective left and right mounting brackets via pivots 23,24, in exactly the same way as described above in connection with the first embodiment.

Each panel in this embodiment has only two rails, which are fixed in height, simplifying the assembly. Each side panel 18,20 has an end post 25,26, respectively at its first end, an upper rail 28,30 and a second rail 32,34, respectively, spaced below the upper rail. The rails are hollow tubular members and an end section 35,36 of each side panel has an upper rail 38,39 and a second rail 40,42, respectively, telescopically engaged in the open ends of the respective upper rails 28,30 and second rails 32,34 of each side panel, in exactly the same way as the upper two rails of the side panels of the previous embodiment. A second end or corner post 44 is secured to the free end of the telescoping rails 39,42 of the right hand side panel 20, while the telescoping rails 28,40 of the left hand side panel 18 are secured together by a vertical cross bar 45. Two pairs of latch flanges 46 project from the lower end of bar 45 and a location adjacent the upper end of bar 45, and have a similar function to the brackets or flanges 366 of the previous embodiment. The two side panels are shown with their telescoping end portions only partially extended in FIG. 5, and it will be understood that they can be further extended to a fully extended condition similar to that illustrated in FIG. 1 of the previous embodiment, or may be fully retracted, or extended to any selected extension between these extremes. The end portions will be secured at a selected extension in exactly the same manner as described in the previous embodiment, using a snap lock pin (not illustrated) on one of the fixed rails which extends through an aligned opening in one of the telescoping rails.

The end panel 22 has a vertical end or corner post 48 and two rails 49,50 each having a first end secured to post 48 and a second end pivotally connected to the end post 44 via pivots 52, which will be identical to the pivots between the upper and middle rails of the end panel and right hand side panel of the previous embodiment. The corner posts 44,48 each have a telescoping lower support leg 53,54, respectively, which is telescopically engaged in the respective post in the same manner as the end posts 327, 354R and 356,354R of the previous embodiment, and is locked in the lowered or raised position via spring loaded lock pins 56. Each support leg 53,54 has a flat pad 55 at its lower end for engaging the ground when the corral apparatus is fully deployed.

The left hand side panel 18 will be releasably secured to the corner post 48 of end panel 22 in a similar manner to the previous embodiment. The telescoping end section 35 will be extended until the two pairs of flanges 46 extend on opposite sides of post 48, and any suitable locking mechanism may extend through openings (not visible in the drawing) in the projecting ends of flanges 46 to secure the side panel to the end panel. As in the previous embodiment, the left hand side panel 18 may be used as a gate, either by releasing and retracting the telescoping end section 35, if this provides a sufficient opening for the animal to enter and exit, or else by releasing the side panel from corner post 48 and then swinging the entire panel open about pivots 23.

As noted above, the corral apparatus may be mounted on the side of an animal trailer, such as a horse trailer, or other vehicle, or on the wall of a building such as a barn. It can be folded completely flat against the mounting surface when not in use, as in the previous embodiment. In order to retract the apparatus from the deployed position of FIG. 5 into a retracted, storage position, the end portion 35 of the left hand side panel is first released from the corner post 48 and moved into a fully retracted position in fixed rails 28 and 32. The side panel 18 is then rotated inwardly about pivots 23 until it is flat against the mounting surface. In the case of a horse or other animal trailer, it will be understood that the height of the second rail 32 is such that it will clear the wheel well of the trailer and be positioned above it when folded flat, thus avoiding the need for a liftable lower or third rail as in the previous embodiment.

Once the left side panel 18 has been folded against the mounting surface or trailer side wall, the telescoping legs 53,54 of the corner posts 44,48 are raised into a retracted position inside the posts and locked in position by lock pins 56. The end panel 22 is then rotated inwardly or clockwise about pivots 52 until it rests flat against the right side panel 20. The extending end portion 36 of the side panel 20 is also moved into a fully retracted position, and the folded end and side panels are then rotated inwardly (clockwise) about pivots 24 to rest flat against the folded left side panel 18. Straps or the like may be provided to hold the folded panels in the stored position, as in the previous embodiment.

This embodiment has fewer parts and is much simpler to deploy and retract than the previous embodiment. There is no sliding or drop down lower or third rail which must be lowered on deployment and raised in order to move the apparatus back into the folded, storage position. There are also only two corner posts with telescoping legs, whereas the previous embodiment had two corner posts as well as two side posts with telescoping legs, further adding to complexity. This embodiment will therefore be less expensive and simpler to assemble than the previous embodiment, and will be lighter in weight.

Figure 6:
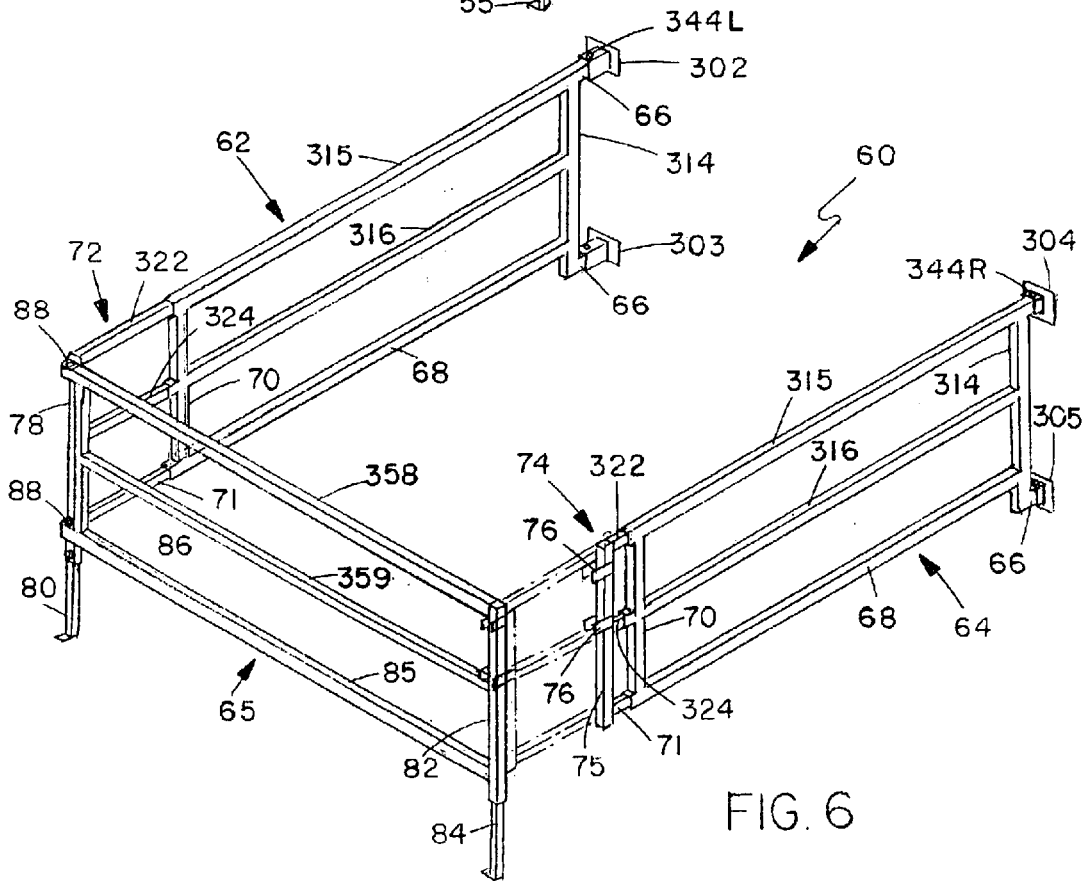
FIG. 6 is a perspective view of an alternative, three rail corral apparatus according to a third embodiment of the invention.

FIG. 6 illustrates another modified corral assembly 60 which is similar to the previous embodiment but has a third vertically fixed rail in each panel, rather than two fixed rails. This embodiment may be used on larger trailers where the apparatus can be mounted away from the wheel well, so that there is no need for a drop down rail as in the first embodiment or a space beneath the second rail as in the previous embodiment so as to clear the wheel well for storage, and can also be used where the apparatus is to be mounted on the side wall of a building, such as a barn. This embodiment is identical to the embodiment of FIGS. 1 to 4 except that the lower or third rails of the side panels and end panels are fixed, not slidable, the vertical, extendible legs 334 in the side panels are eliminated, and the side panels are reversed with the right hand side panel forming the gate, rather than the left hand side panel as in FIGS. 1 to 4. Like reference numerals have been used for like parts as appropriate. It will be understood that the gate may be provided on either side in any of the corrals described herein.

The apparatus 60 basically comprises a pair of side panels 62,64 and an end panel 65, and mounting brackets 302,303, 304,305 for mounting the apparatus on a suitable flat surface such as the side of an animal trailer or a wall of a building, such as a barn. Each side panel 62,64 has a first end post 314 having a pair of pivot mounting projections 66 at its upper and lower end which are pivoted to the respective brackets 302,303 and 304,305 via pivots 344L and 344R. Three spaced, horizontal fixed rails 315,316,68 project from the end posts 314, and a vertical cross bar 70 extends between the rails adjacent their ends. The rails 315,316 and 68 are all hollow bars and are in telescoping engagement with corresponding parallel rails 322,324 and 71 of telescoping end portions 72,74 of the respective side panels. The rails of the telescoping end portion 74 of the right hand side panel are secured together by a vertical post 75 at their free ends, and two pairs of flanges or latch brackets 76 project from the post 75. A vertical end post 78 with a leg 80 telescopically mounted in its lower end is secured between the ends of the rails of the telescoping end portion 72 of the left hand side panel.

The end panel 65 has a first vertical end or corner post 82 with a leg 84 telescopically mounted in its lower end, and three, fixed parallel horizontal rails 358,359 and 85 project from the post 82. A cross bar 86 secures the rails together at their opposite ends. The end panel 65 is pivotally secured to the end post 78 of the left hand side panel via pivots 88. The side panel 64 is releasably secured to the end post 82 as indicated in dotted outline in FIG. 6, and as in the previous embodiments, via the flanges 76 which project on opposite sides of the end post and are secured in position via a suitable releasable fastener extending through openings (not illustrated) in the flanges.

As in the previous embodiments, each side panel has a telescoping end portion which can be adjusted in extension from the fixed portion so as to vary the size of the corral. FIG. 6 shows a partially extended position, while the fully extended position will be similar to that illustrated in FIG. 1. The telescoping rails are secured in a selected adjusted position in exactly the same manner as described above in connection with the first embodiment. The telescoping legs 80,84 of the end posts 78 and 82 are also secured in their raised or lowered positions as in the previous embodiments, via spring loaded locking pins 90 which engage through the respective post into associated openings in the leg.

This embodiment is slightly different from the previous embodiments in that the end panel is pivoted to the left hand side panel, rather than the right hand side panel, and the right hand side panel is releasably latched to the opposite end of the end panel. It will be understood that this arrangement may be reversed. However, operation is otherwise the same as in the previous embodiment, since all three rails are fixed and there is no need to drop down or raise the lower rail of each panel when deploying or storing the apparatus. If the apparatus is to be folded out of the way against the mounting surface, all that is necessary is for the latch flanges 76 to be released, the telescoping end portion 74 to be moved into the retracted position illustrated in solid outline in FIG. 6, and the right hand side rail is then rotated about pivots 344R flat against the mounting surface. The telescoping legs 80,84 are then lifted into the retracted, raised position, the end panel 65 is folded flat against side panel 62, and the telescoping end portion 72 of the side panel is retracted before folding the end panel and side panel 62 flat against panel 64 by rotating about pivots 344L. The apparatus can be held in the folded, storage position with straps or the like. This embodiment also has fewer parts than the first embodiment, and is easier to move between the stored and deployed positions, and vice versa. The third rail leaves a smaller gap beneath the corral panels, as may be needed when used for smaller animals. As in the previous embodiments, the latched side panel, in this case right hand side panel 64, can be used as a gate by retracting the telescoping end portion 74, if sufficiently extended, or by pivoting the entire side panel 64.

Figure 7:
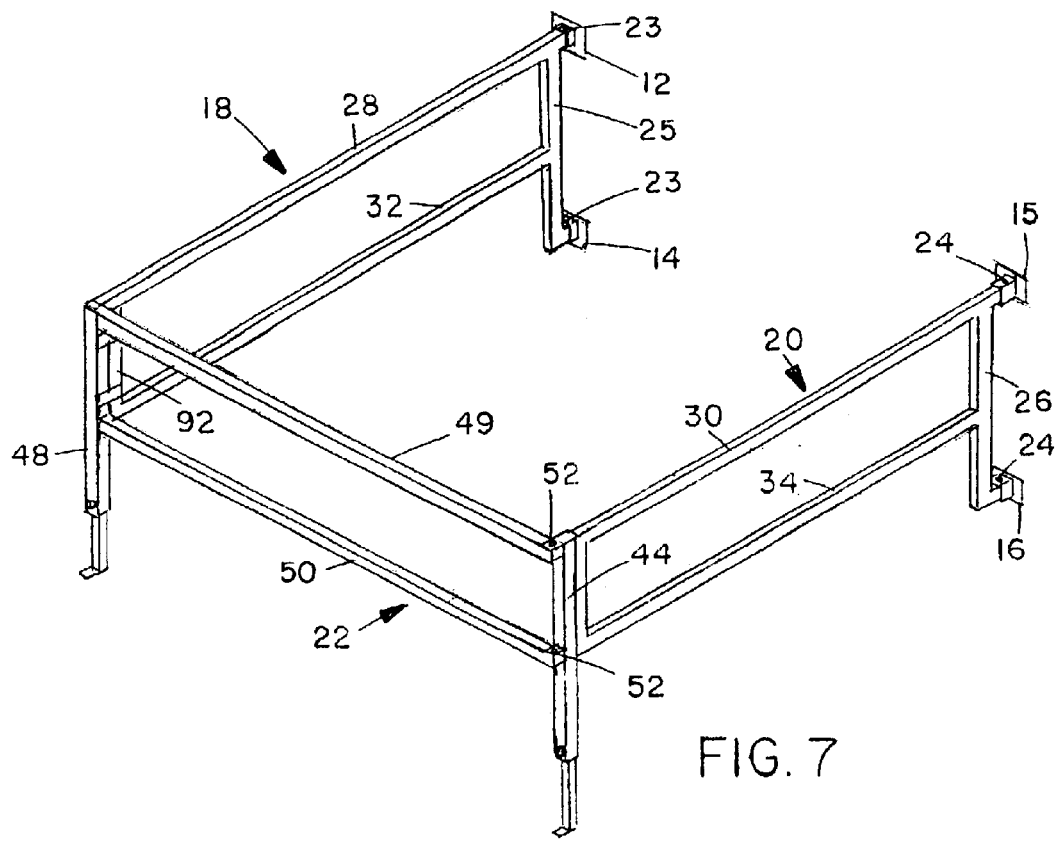
FIG. 7 is a perspective view illustrating another modified embodiment of the invention for a fixed size corral.

FIG. 7 illustrates another embodiment of the invention where the corral is of fixed size. In this case, the telescoping end portions of the side panels are eliminated. The corral apparatus 90 of FIG. 7 is otherwise more or less identical to that of FIG. 5, and like reference numerals have been used for like parts as appropriate. The corral apparatus 90 of FIG. 7 comprises two pairs of mounting brackets 12,14,15,16 for mounting at spaced locations on a suitable support surface such as the side wall of an animal trailer or a wall of a building, a pair of side panels 18,20 each pivoted to the respective mounting brackets 12,14 and 15,16 via pivots 23,24, and an end panel 22, with the side panels and end panels each having two rails. It will be understood that the panels may alternatively have three rails, as in FIGS. 1 to 4 or FIG. 6.

Each side panel 18,20 has an end post 25,26, respectively, which is pivoted to the associated mounting brackets, and a pair of parallel rails 28,32 and 20,34, respectively. The rails 20,34 are secured directly to the vertical end or corner post 44 at their ends, eliminating the telescoping end portion of FIG. 5. The end panel 22 has a vertical end or corner post 48 at its left hand end, and a pair of parallel horizontal rails 49,50 project from the corner post 48 and are pivoted at their opposite ends to the corner or end post 44 of the right hand side panel 20 via pivots 52, in exactly the same manner as the embodiment of FIG. 5. Each of the corner posts 44,48 has a drop down, telescoping leg 53,54, as in the second embodiment. In this embodiment, the projecting latch flanges 46 of FIG. 5 are eliminated, since these will not work without a telescoping end portion of side panel 18, and the end of side panel 18 is instead latched to the end post 48 in some other manner, for example via a rotating latch member or a latch pin which can be extended from post 48 through an opening in end bar 92 of the side panel 18, for example. The corral apparatus 90 can be folded for storage in a similar manner to the previous embodiments. The side panel 18, which is slightly shorter than end panel 22, is first released from the end panel and then folded about pivots 23 until it is flat against the support surface. The telescoping legs 53,54 of the corner posts 44,48 are then raised and locked in their retracted positions, the end panel 22 is folded flat against side panel 20 by rotating about pivots 52, and the side panel 20 and end panel 22 are folded together about pivots 24 until they are flat against the first panel 18.

This embodiment is a further simplification of the embodiment of FIG. 2, having a reduced number of parts, and is simpler and easier to deploy and retract for storage. However, the corral in this case is fixed in size. The side panel 18 or the end panel 22 may be used as the gate in this case. There are only three pivot locations, where the two side panels pivot to the mounting surface and the end panel pivots to one side panel, and only two extendible parts, the telescoping legs 53 and 54. The apparatus will be of light weight construction, will be relatively inexpensive, and is less subject to failure or jamming than corral systems having a larger number of pivoted and extending parts.

Figure 8:
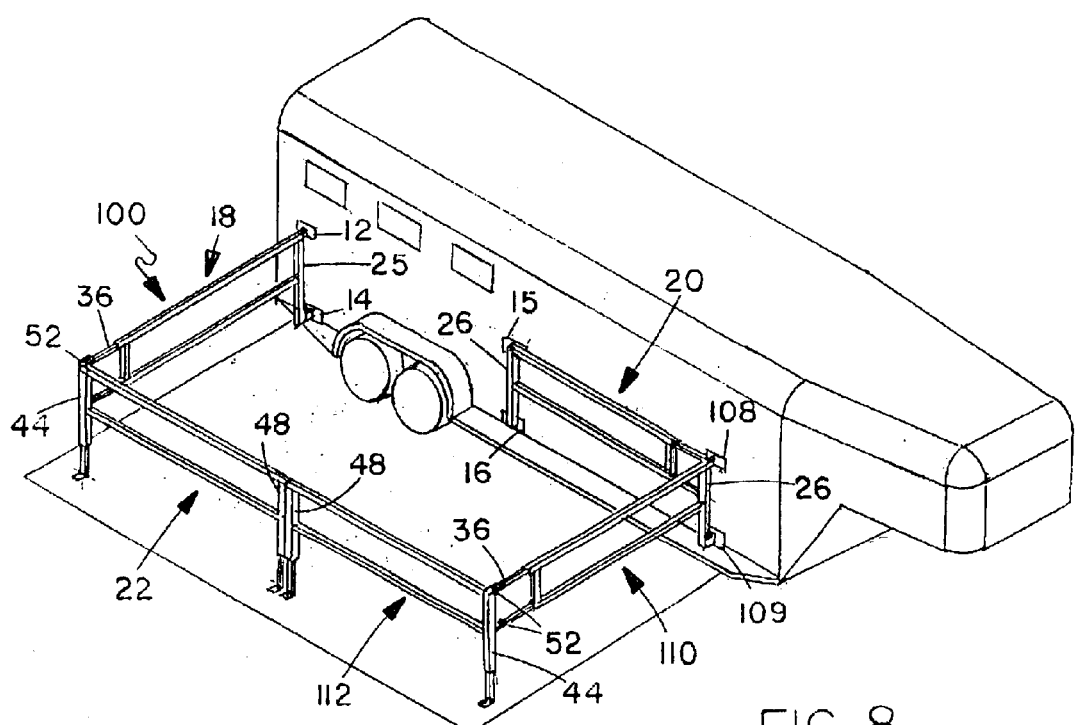
FIG. 8 is a perspective view of a modified corral apparatus according to another embodiment of the invention, mounted on the side of an animal trainer in one possible deployed condition.
Figure 9:
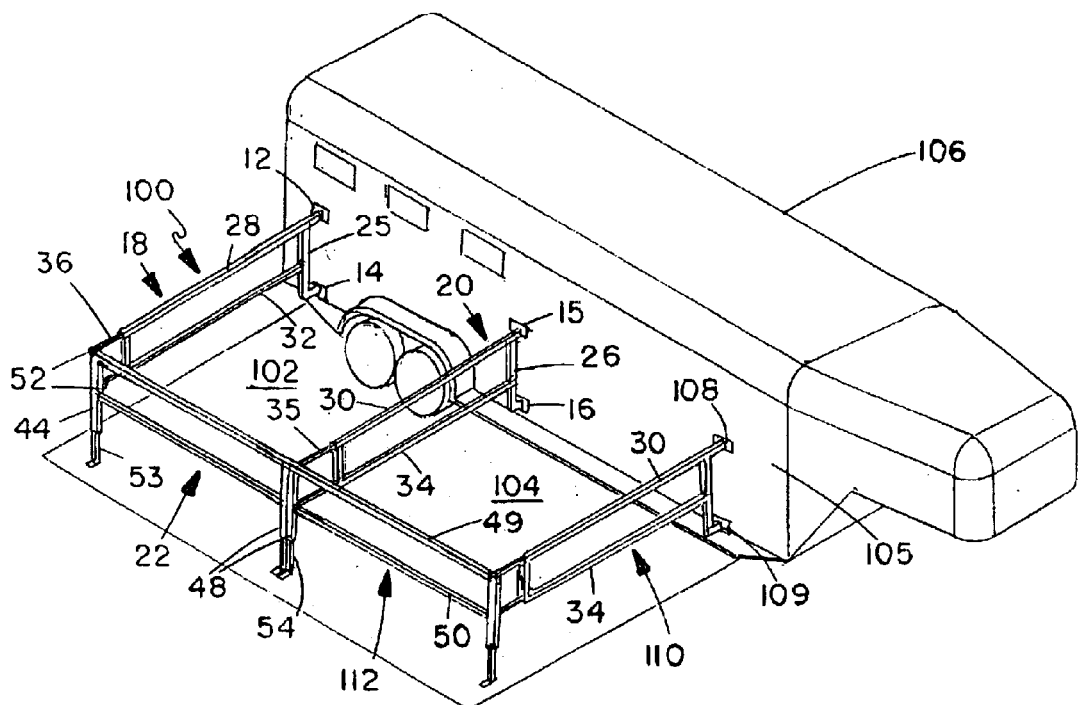
FIG. 9 is a perspective view similar to FIG. 8 illustrating another possible deployed condition providing two side-by-side corrals.
Figure 10:
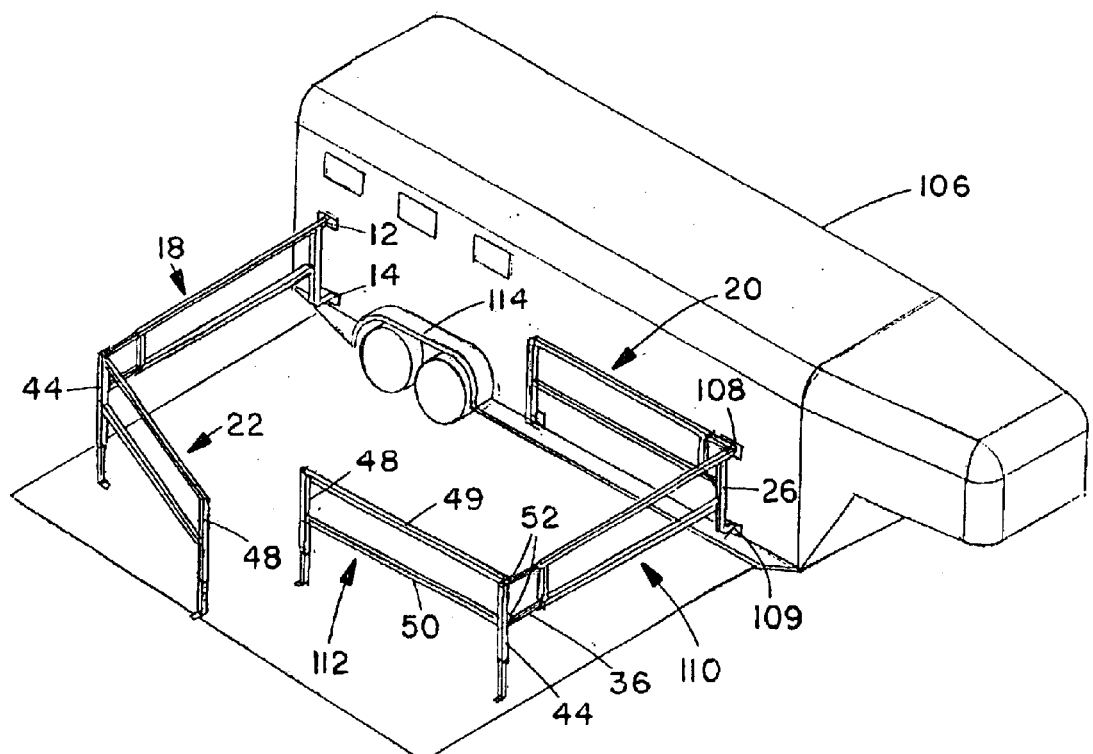
FIG. 10 is a perspective view similar to FIG. 8 illustrating operation of the gate.

FIGS. 8 to 10 illustrate a corral apparatus 100 according to another embodiment of the invention, in which a first three sided corral 102 similar to the corral apparatus 10 of FIG. 5 is associated with a half corral 104 to form two, side-by-side corral enclosures when deployed as illustrated in FIG. 9. The first corral 102 is more or less identical to the corral apparatus 10 of FIG. 5, and like reference numerals have been used for like parts as appropriate. The only difference is that the right and left hand side panels are reversed, with the right hand side panel 20 being releasably latched to the end panel 22, and the end panel 22 being pivoted to the left hand side panel 18 (similar to the arrangement of FIG. 6).

The corral apparatus 100 is illustrated in the drawings mounted on the side wall 105 of an animal trailer 106, such as a horse trailer. The first corral 102 has two rail side panels 18, 20 each pivoted at one end to the respective mounting brackets 12,14 and 15,16, in exactly the same way as described above in connection with FIG. 5, and having telescoping end portions 36,35. The two rail end panel 22 has a vertical post 48 at its right hand end, rather than its left hand end, in this case. The vertical corner post 44 at the end of telescoping portion 36 is located on the left hand side panel in this case, at the opposite, left hand corner of the corral. The end panel 22 is pivoted to the end or corner post 44 at its left hand end via pivots 52, similar to pivots 52 of FIG. 2. The end of the telescoping end portion 35 of the right hand side panel 20 is releasably latched to the end post 48 of the end panel in any suitable manner, for example via flanges 46 (not illustrated), as in the embodiment of FIG. 5, the flanges engaging on opposite sides of post 48 and suitably locked in position.

The second, or half corral 104 is in three basic parts, comprising a pair of mounting brackets 108,109 identical to the brackets 15,16 for mounting on the side wall 104 at a suitable spacing from brackets 15,16, a side panel 110, and an end panel 112 pivoted to the end of the side panel. Side panel 110 is identical to the right hand side panel 20 of FIG. 5, and like reference numerals have been used for like parts as appropriate. Similarly, end panel 112 is identical in structure to the end panel 22 of FIG. 5, although it may vary in length, and like reference numerals are used for like parts as appropriate. Side panel 110 has an end post 26 at one end suitably pivoted to the mounting brackets 108,109, and a telescoping end portion 36 at the opposite end terminating in a vertical end or corner post 44. End panel 112 is pivoted at its right hand end to the corner post 44 via pivots 52 identical to the pivots 52 of FIG. 5, and has a vertical end post 48 at its opposite end. Each of the two corner posts 44 and two end panel posts or center posts 48 have drop down legs 53,54, respectively, as in the single corral apparatus of FIG. 5. A suitable releasable latch will be provided for releasably securing the end post 48 of the corral 102 to the end post 48 of the half corral 104, such as a retractable lock pin on one post which can be extended through a suitable opening in the other post.

The corral apparatus 100 of FIGS. 8 to 10 can be deployed in several different ways, depending on the number of animals to be held and the size of corral required. In FIG. 9, both the main corral 102 and the half corral 104 are fully deployed, forming two side-by-side corrals with side panel 20 of the main or first corral forming the dividing wall between the enclosures. Side panel 20 is releasably latched to the end post 48 of end wall 22 in any suitable manner, for example via latch flanges as in the previous embodiments. In this case, end wall 22 forms the gate to the first corral 102 while end wall 112 forms the gate to the adjacent corral 104. If a single, larger corral is needed, the side panel 20 is simply unlatched from end post 48, the telescoping end portion 35 is retracted, and the panel 20 is rotated about hinges 24 until it is flat against the side wall 105 of the trailer, as illustrated in FIG. 8. This forms a single, larger enclosure. End panel 22 may form the gate of the larger corral, as indicated in FIG. 10.

Although the 1.5 corral system of FIGS. 8 to 10 has the central panel 20 releasably latched to an end panel, and each end panel pivoted at the outer corners to the ends of the outer side panels, the first corral 102 may alternatively be arranged as illustrated in FIG. 5. In this case, the outer side panel 18 will be releasably latched to end panel 22 and act as the gate, and end panel 22 will be pivoted to central panel 20. In this case, the pivoted end wall 112 of the add on, half corral assembly will comprise the gate to access corral 104, while outer side panel 18 is the gate for access to corral 102. This arrangement provides only two side-by-side corrals, and cannot be arranged as a single, big corral as in FIG. 10. However, some user's may be only interested in the capability of providing two side-by-side corrals.

It will be understood that the overall corral size in both FIGS. 8 and 9 can be further adjusted by changing the length of the side panels, extending or retracting the extendible end portions 35,36 of panels 18 and 110 in FIG. 8, or 18,20 and 110 in FIG. 9, as desired. If a single, small corral is required, the half corral 104 may be folded away, by first releasing the end post 48 of end panel 112 from the adjacent end post 48 of end panel 22, then retracting the telescoping end portion 36 of side panel 110, and subsequently folding the end panel 112 inwardly about pivots 52 until it is flat against panel 110, then folding both panels inwardly about the pivots at brackets 108,109 until they rest flat against the side wall 105. Suitable fasteners such as straps may be provided for holding the folded panels against the wall of the trailer, as in previous embodiments.

When the entire corral apparatus is to be stored while animals are transported inside the trailer, for example, the panels are all folded flat against the side wall in an equivalent manner to previous embodiments. The dividing panel 20 is first folded flat as in FIGS. 8 and 10. The half corral is then folded flat against panel 20, by first releasing end panel 112 from panel 22, then folding it flat against panel 110, retracting the extending end portion 36 of panel 110, and folding both panels inwardly against panel 20. End panel 22 is then folded against panel 18, with the telescoping end portion retracted, and both panels folded inwardly against the side wall 105 above wheel well 114.

The apparatus 100 of FIGS. 8 to 10 is suitable for larger trailers which have sufficient space for mounting the two side-by-side corrals and which typically may carry more than one animal, requiring more space in a single corral as in FIG. 8, or separate corrals as in FIG. 9. This version is very versatile and may be assembled to provide one or two corral enclosures of adjustable size.

Due to its light weight and compact nature, the corral apparatus of this invention can be readily mounted on a vehicle such as a trailer used to transport animals, e.g. a horse trailer. On long journeys, the portable corral can be set up anywhere the trailer is parked to accommodate one or more animals during a rest stop, so that they have more space. It may also be conveniently mounted on a wall of a building, such as inside or outside a barn, to provide a temporary corral or foldable corral. The apparatus can then be folded flat against the wall when not in use or when the barn has to be cleaned, for example.

The corral apparatus of this invention is lightweight, inexpensive, and is easy to use. Unlike previous corrals for use with animal trailers or the like, it can be readily and quickly deployed by one person. In the illustrated embodiments, the apparatus is shown attached to an animal trailer, such as a horse trailer, but it may alternatively be attached to a recreational vehicle, for example, to be used for holding pets when camping, for example. Alternatively, the apparatus may be attached to a permanent structure such as a house, garage, or other building or a permanent wall or fence, for use in containing or protecting other animals or children. Thus, for example, it may be used to fence off a pool when not in use, or other potentially dangerous areas, or to provide a temporary outdoor pen for pets or a playpen for young children. The corral can also be easily adjusted in size according to the available space. The retractable lower rails of each panel are extended when the corral is deployed, reducing the space under the fence or panel, and thus reducing the risk of an animal inserting its head under the fence panel.

Although some exemplary embodiments of the invention have been described above by way of example only, it will be understood by those skilled in the field that modifications may be made to the disclosed embodiments without departing from the scope of the invention, which is defined by the appended claims.

We claim:

1. A corral apparatus for attachment to a wall of a vehicle, trailer, or building, comprising:

first and second mounting assemblies for securing at predetermined spaced locations on a wall;

a first side panel having a first end pivotally secured to the first mounting assembly to form a first pivot joint, and a second end;

a second side panel having a first end pivotally secured to the second mounting assembly to form a second pivot joint, and a second end;

an end panel extending between the second ends of the side panels in a deployed position of the apparatus, whereby an enclosure is formed by the wall, side panels and end panel; and the end panel having a first end pivotally secured to the second end of one of the side panels to form a third pivot joint, and a second end, and being movable between a deployed position extending transversely between the side panels and a collapsed position folded flat against the first side panel, and the side panels being movable between a deployed position extending outwardly in a direction perpendicular to the wall and a collapsed position folded flat against the wall together with the end panel;

whereby there are only three panels and three pivot joints in the apparatus.

2. The apparatus as claimed in claim 1, wherein each mounting assembly comprises first and second vertically spaced mounting brackets, and the first end of each side panel has two spaced pivot extensions which are pivotally connected to the respective first and second mounting brackets to form said pivot joints.

3. The apparatus as claimed in claim 1, wherein each mounting assembly comprises a single mounting bracket.

4. The apparatus as claimed in claim 1, wherein each side panel has a first portion having a first end corresponding to the first end of the panel and a second end, and a second, telescoping end portion telescopically engaged in the second end of the first portion and extending up to the second end of the panel, whereby the length of each side panel may be adjusted by varying the extension of the telescoping end portion from the first portion of the side panel.

5. The apparatus as claimed in claim 1, wherein each panel has an adjustable lower portion which is movable between a lowered, ground engaging position when the apparatus is in a deployed condition, and a raised, retracted position when the apparatus is in the collapsed and folded position.

6. The apparatus as claimed in claim 1, wherein one of the panels comprises a gate for entry into and exit from the corral when in the deployed condition.

7. The apparatus as claimed in claim 6, wherein the end panel comprises the gate.

8. The apparatus as claimed in claim 6, wherein the gate comprises at least part of one of the side panels.

9. The apparatus as claimed in claim 1, wherein each panel is fixed in length.

10. The apparatus as claimed in claim 1, wherein each side panel has a telescoping end portion for adjusting the size of a corral formed by the panels in the deployed condition.

11. The apparatus as claimed in claim 10, wherein the telescoping end portion of the second side panel comprises a gate for animals to enter and exit the corral.

12. The apparatus as claimed in claim 1, wherein each panel comprises a frame having at least two parallel, horizontal cross bars and spaced vertical posts.

13. The apparatus as claimed in claim 12, wherein each frame is made of tubular aluminum material.

14. The apparatus as claimed in claim 12, wherein each frame has three parallel, fixed horizontal rails comprising an upper rail, a middle rail, and a lower rail.

15. The apparatus as claimed in claim 1, wherein each panel has only two spaced, parallel horizontal rails extending along its length.

16. The apparatus as claimed in claim 15, wherein each rail of the side panels has telescoping end portions for adjusting the length of the respective side panel between a fully extended position in which the side panel has a maximum length and a fully retracted position in which the side panel has a minimum length.

17. The apparatus as claimed in claim 16, wherein the rails are hollow tubular members, the rails of each side panel frame each having first and second telescoping parts, the first part being of larger cross-sectional dimensions and the second parts of the rails comprising said telescoping end portions.

18. The apparatus as claimed in claim 1, including a latch mechanism for releasably securing the second end of the end panel to the second end of the second side panel in the deployed condition.

19. The apparatus as claimed in claim 1, wherein the panels in the deployed condition form a corral having a first pair of corners at the first ends of the side panels and a second pair of corners at a junction between each side panel and the end panel, the second pair of corners each comprising a corner post having a downwardly depending support leg movable between a retracted position raised above the ground and a lowered, deployed position contacting the ground to support the panels in the deployed condition.

20. The apparatus as claimed in claim 1, wherein said first and second side panels and end panel together form a first corral, and an add-on corral section is provided for mounting on said wall adjacent said first corral, the add-on section comprising a third mounting assembly for securing at a predetermined location on said wall spaced from said second mounting assembly, a third side panel having a first end pivotally secured to said third mounting assembly and a second end, and a second end panel extending between the second ends of the second and third side panels to form a second corral side-by-side with the first corral.

21. The apparatus as claimed in claim 20, wherein the second end panel has a first end pivotally secured to the second end of the third side panel and a second end, and being movable between a collapsed position folded flat against the third side panel and a deployed position extending transversely between the third and second side panels, the second end of the second end panel being located adjacent an end of the first end panel in the deployed position.

22. The apparatus as claimed in claim 21, the first end panel is pivotally secured to the second end of the first side panel and releasably securable to the second end of the second side panel, and the second end of the second side panel is releasably securable to the second end of the first end panel, whereby the second side panel may be deployed and releasably secured to the second end of the first end panel to form a dividing wall between said corrals, and may be released from the first end panel and folded flat against the wall such that the first side panel, two end panels, and third side panel form a single, larger corral.

23. The apparatus as claimed in claim 1, including a releasable locking device for locking the panels to at least one mounting assembly in the folded position.

24. A corral apparatus for attachment to a vehicle, trailer, or building, comprising:

at least two mounting assemblies for securing at predetermined, horizontally spaced locations on a surface of a vehicle, trailer, or building;

a first side panel having a first end pivotally secured to one of the mounting assemblies and a second end;

a second side panel having a first end pivotally secured to the other mounting assemblies and a second end; each of the side panels being adjustable in length; and an end panel extending between the second ends of the side panels, whereby an enclosure is formed by the surface, side panels, and end panel;

each panel having at least two spaced, horizontal rails;

the end panel being pivotally secured to at least one of the side panel second ends, and being movable between a deployed position extending transversely between the side panels and a collapsed position folded inwardly against at least one of the side panels, and the side panels being movable between a deployed position extending outwardly from the surface and a collapsed position folded flat against one another and the surface; and at least one third mounting assembly for securing at a predetermined location on said surface at a horizontal spacing from said first two mounting assemblies, a third side panel having a first end pivotally secured to said third mounting assembly and a second end, and a second end panel having a first end pivotally secured to the second end of the third side panel and a second end, the third side panel and second end panel being movable between a collapsed position folded inwardly against the surface and a deployed position in which said third side panel extends outwardly transverse to the surface and parallel to said first and second side panels and said second end panel extends transverse to said third side panel up to the first mentioned end panel, whereby two side-by-side corrals are formed.

25. The apparatus as claimed in claim 24, wherein each panel has only two rails.

26. The apparatus as claimed in claim 25, wherein each rail of the side panels has a telescoping end portion for providing said panel length adjustment.

27. The apparatus as claimed in claim 24, wherein each panel has three spaced horizontal rails which are each fixed in height.

28. The apparatus as claimed in claim 24, wherein the end panel is formed in one piece.

29. The apparatus as claimed in claim 24, wherein each mounting assembly comprises a pair of spaced mounting brackets, and the first end of each side panel is pivotally connected to the respective mounting brackets at two vertically spaced locations.

* * * * *